(No Model.)

F. S. CARR.
CARRIAGE IRON.

No. 553,668. Patented Jan. 28, 1896.

Witnesses:
Walter E Lombard.
Jonathan Cilley

Inventor:
Fred S. Carr
per T. W. Porter Atty

UNITED STATES PATENT OFFICE.

FRED S. CARR, OF WEST NEWBURY, MASSACHUSETTS.

CARRIAGE-IRON.

SPECIFICATION forming part of Letters Patent No. 553,668, dated January 28, 1896.

Application filed June 4, 1895. Serial No. 551,590. (No model.)

*To all whom it may concern:*

Be it known that I, FRED S. CARR, of West Newbury, in the county of Essex and State of Massachusetts, have invented a new and useful Improvement in Carriage-Irons, which will, in connection with the accompanying drawings, be hereinafter fully described, and specifically defined in the appended claims.

Figure 1:
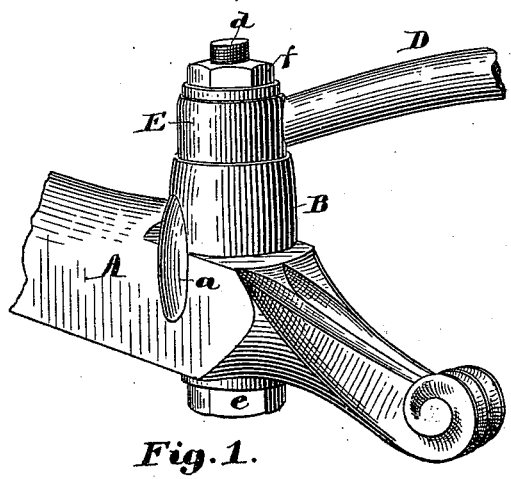
Figure 2:
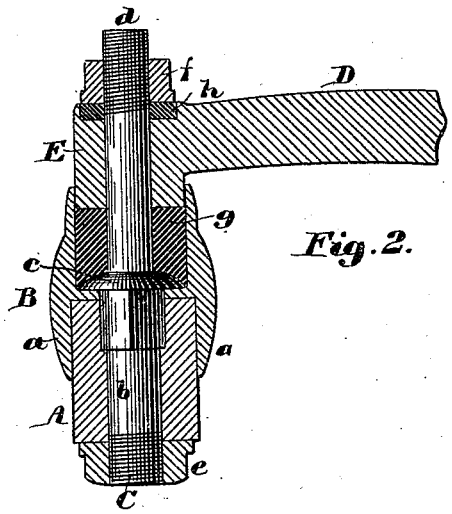

In said drawings, Figure 1 is a perspective view of the end portion of a spring-bar with my invention thereto attached, and shown in perspective. Fig. 2 is a vertical section of Fig. 1, taken transversely to the spring-bar and centrally through the hanging iron.

The object of my invention is to make a firm connection between the body-supporting irons and the spring-bars of elliptic-spring vehicles and a yielding connection between the socket and hanging iron; and the invention consists in a metal socket seated upon the spring-bar and preferably formed with lugs that inclose the sides of said bar, a double-ended bolt the midway head of which is seated upon the floor or bottom of said socket, and a stem extending from said head down through the bar, where it is rigidly secured by a nut, the other stem of said bolt extending upward above said socket, a rubber cushion arranged on said upper stem within said socket, the hanging iron formed with a rounded end that is seated upon said cushion within the socket, a thinner rubber cushion seated in a cavity in the top of said hanging iron, and a nut that serves to duly compress both said cushions and to secure the hanging iron and socket together.

Referring again to said drawings, A represents the end portion of the spring-bar of an elliptic-spring vehicle.

B is a metal socket seated upon A, said socket being preferably formed with lugs $a\ a$, that extend down and embrace the sides of bar A.

C represents a double-ended bolt, the head being shown at $c$, seated upon the floor of socket B, the lower stem, $b$, extending down through bar A and rigidly secured by nut $e$, the upper stem being shown at $d$. A rubber or analogous cushion $g$ is seated in socket B, and on it is seated the rounded end E of hanging iron D, through which stem $d$ passes.

In the top of iron D is a cavity in which is seated a thinner cushion $h$, which is duly compressed by the securing-nut $f$, threaded to the stem $d$, as shown, by which devices the socket is firmly secured to the bar and the hanging iron is cushioned against both upward and downward strain and pressure.

Divers changes may be made in details of construction without departing from the essential nature of my invention.

Having thus described my invention, what I claim as new, and desire to secure by Letters Patent, is—

1. The combination of spring bar A socket B double ended bolt C and hanging iron D, the head of said bolt being seated on the bottom of said socket, the lower stem being secured in said bar by nut $e$ and the upper stem passing through said hanging iron and being secured by nut $f$, all substantially as specified.

2. The combination of bar A socket B double ended bolt C and hanging iron D all constructed and arranged substantially as specified, and a cushion $g$ arranged in said socket upon the upper stem of said bolt, substantially as described.

FRED S. CARR.

Witnesses:
JONATHAN CILLEY,
T. W. PORTER.